United States Patent [19]

Kodera et al.

[11] 4,451,909
[45] May 29, 1984

[54] ULTRASONIC WAVE DISTANCE DETECTION SYSTEM

[75] Inventors: Masao Kodera; Shigeyuki Akita, both of Okazaki, Japan

[73] Assignee: Nippon Soken, Inc., Nishio, Japan

[21] Appl. No.: 329,826

[22] Filed: Dec. 11, 1981

[30] Foreign Application Priority Data

Dec. 18, 1980 [JP] Japan .................... 55-178038

[51] Int. Cl.³ .................. G01S 15/10; G01S 7/52
[52] U.S. Cl. ........................... 367/99; 73/900;
343/5 SM; 367/900
[58] Field of Search ............ 367/900, 99; 343/5 SM; 73/900

[56] References Cited

U.S. PATENT DOCUMENTS

| 3,683,324 | 8/1972 | Hoxsie | 367/900 X |
| 3,787,803 | 1/1974 | Beebe | 367/900 X |
| 3,926,039 | 12/1975 | Zhukov et al. | 73/900 X |
| 3,942,181 | 3/1976 | Berrod et al. | 343/16 M |
| 4,205,555 | 6/1980 | Hashiguchi | 73/900 X |

Primary Examiner—Richard A. Farley
Attorney, Agent, or Firm—Cushman, Darby & Cushman

[57] ABSTRACT

In an ultrasonic wave distance detection system, an ultrasonic wave pulse radiated into the selected area is reflected on an object. Said reflected ultrasonic wave pulse is partly received by an ultrasonic wave transducer. The received signal is supplied to a variable gain amplifier, noise components are removed from the amplified signal through a band pass filter, the noise removed signal is detected by an envelope detector, the detected signal is compared with a predetermined level by a comparator, and the output of the comparator is applied to a flip-flop circuit.

As the gain of the variable gain amplifier is set to be a lower level only at the beginning of the ultrasonic wave pulse to minimize the amplification of unnecessary signals without reducing the detection efficiency, a signal can be surely obtained which has a pulse width corresponding to the distance between the system and the object and thus the distance can be detected or measured.

4 Claims, 6 Drawing Figures

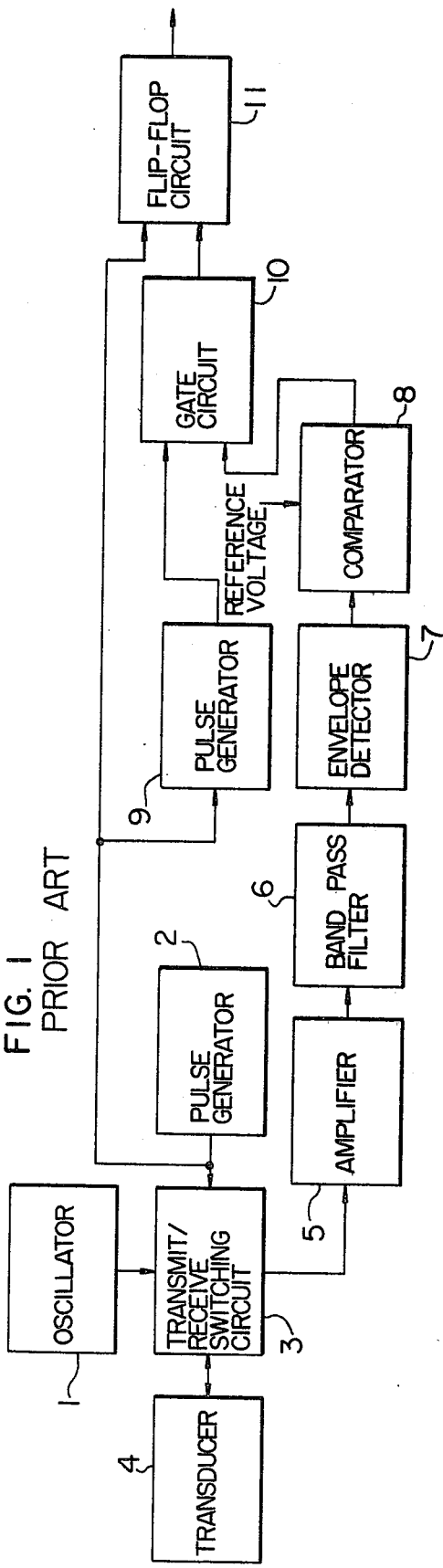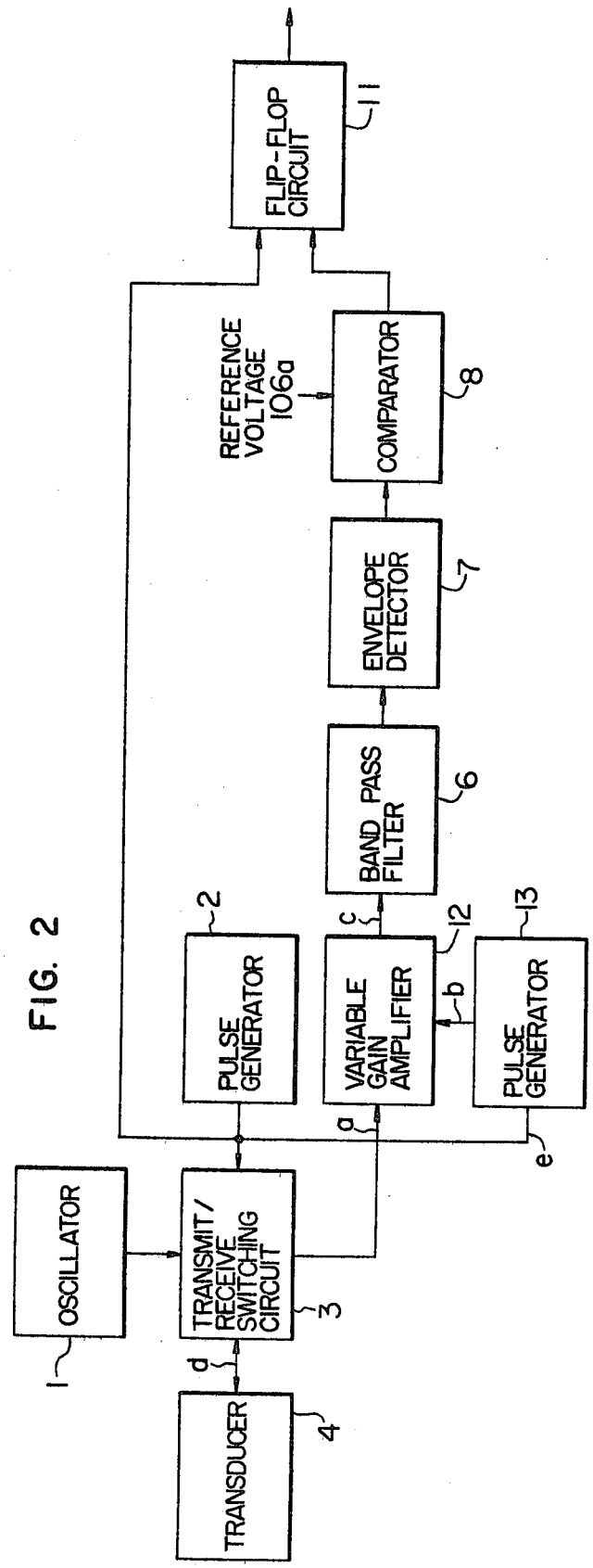

ULTRASONIC WAVE DISTANCE DETECTION SYSTEM

BACKGROUND OF THE INVENTION

1. Field of the Invention

The present invention relates generally to an ultrasonic wave distance detection system which sends and receives an ultrasonic wave pulse toward an object in order to detect the distance between the system and the object, and for example, concerns an ultrasonic wave distance detection system which detects the distance between an obstacle located to the rear of a vehicle such as a car and the system.

2. Description of the Prior Art

Prior to an explanation of the present invention, an ultrasonic wave distance detection system of prior art will be explained for a better understanding of the present invention.

Referring to FIG. 1, there is shown a block diagram of a prior art ultrasonic wave distance detection system which includes an oscillator 1 for generating a carrier wave of a carrier frequency available for an ultrasonic wave to be transmitted or emitted, a first pulse generator 2 for generating a transmit/receive switching signal, a transmit/receive switching circuit 3 connected to the first pulse generator 2 to respond to the switching signal, an ultrasonic wave transducer 4 connected to the transmit/receive switching circuit 3 for transmitting or receiving an ultrasonic wave pulse, an amplifier 5 for amplifying the output of the transmit/receive switching circuit 3, a band pass filter 6 connected to the amplifier 5, an envelope detector 7 connected to an output of the band pass filter 6, a comparator 8 for comparison of an output signal voltage of the envelope detector 7 with a selected reference voltage, a second pulse generator 9 connected to the first pulse generator 2 to generate a signal of a given pulse width in synchronization with the transmit/receive switching signal, a gate circuit 10 which receives an output signal from the comparator 8 and an output signal from the second pulse generator 9, and a flip-flop circuit 11 which receives the switching signal from the first pulse generator 2 and an output signal from the gate circuit 10.

In operation, first, a logic signal from the first pulse generator 2 will cause the switching circuit 3 to connect the oscillator 1 with the transducer 4 to thereby emit an ultrasonic wave into the selected area. Immediately after the emission, the distance detection system is put in the signal receiving mode so as to allow the switching circuit 3 to connect the transducer 4 with the amplifier 5. The emitted ultrasonic wave is reflected on an obstacle or obstruction. After the emitted wave is partly received by the transducer 4 and amplified by the amplifier 5, it is sent to the band pass filter 6 to remove the noise components. It is applied to the envelope detector 7 for envelope detection and then to the comparator 8 for comparison with the selected reference voltage. However, even after removal of a drive or excitation signal from the oscillator 1 to the transducer 4, there still remains in the transducer a relatively high damping oscillation signal which will be undesirably amplified, detected and compared in the same way as the desirable signal.

As a result, the comparator 8 will produce a mixed output of an undesirable pulse signal resulting from the damping oscillation referred to above and a desirable pulse signal resulting from the reflected wave or echo from the obstacle. The gate circuit 10 receives at one input terminal this mixed output signal and at the other input terminal a pulse signal from the second pulse generator 9 which is synchronized with the transmit/receive switching signal of a time duration longer than the sustained or persistant time of the above damping oscillation. Therefore, the gate circuit 10 functions to pass the echo pulse signal alone and send it to a reset terminal of the flip-flop circuit 11. Since a set terminal of the flip-flop circuit 11 is coupled to the output of the first pulse generator 2, the flip-flop circuit 11 will generate a pulse signal of a time duration required from emission of the ultrasonic wave to reception of an echo signal from the obstacle, in other words, a pulse signal having a time duration corresponding to the distance up to the obstacle.

In the case where such a conventional ultrasonic wave distance detection system is used for automobiles in order to detect obstacles, however, the acoustic or sound pressure of the received ultrasonic wave changes depending upon obstacles and sometimes becomes very weak when the wave is directed to certain obstacles. Further, it is required that the detecting distance range of the detection system be within several meters, which inevitably results in the fact that the gain of the amplifier 5 must be high. In addition, even after a drive signal from the oscillator 1 in the transmission mode is removed from the transducer 4 and the transducer is moved into the signal reception mode, there still remains a damping oscillation phenomenon in the transducer. This damping oscillation will cause the output of the amplifier 5 to reach its saturation voltage level, thereby making it impossible to detect objects at a short distance.

The prior art system has such a serious defect that the gain of the amplifier 5 must be lowered and the detection efficiency must be substantially reduced in order to avoid this problem.

SUMMARY OF THE INVENTION

Accordingly, it is an object of the present invention to provide an ultrasonic wave distance detection system in which the gain of the variable gain amplifier can be set to be a lower level only at the beginning of signal reception when an obstruction is at a relatively short distance to allow the detection of the distance between the system and the obstruction while minimizing the amplification of unnecessary signals, without reducing the detection efficiency.

It is another object to provide an ultrasonic wave distance detection system in which the gain of the variable gain amplifier can be set at a high level when an obstacle is at a relatively long distance in order to detect the distance between the system and the obstacle.

BRIEF DESCRIPTION OF THE DRAWINGS

FIG. 1 is a block diagram of an ultrasonic wave distance detection system in prior art.

FIG. 2 is a block diagram of an ultrasonic wave distance detection system in accordance with an embodiment of the present invention.

In the figures, like reference numerals refer to like components.

DESCRIPTION OF THE PREFERRED EMBODIMENT

Figure 3:
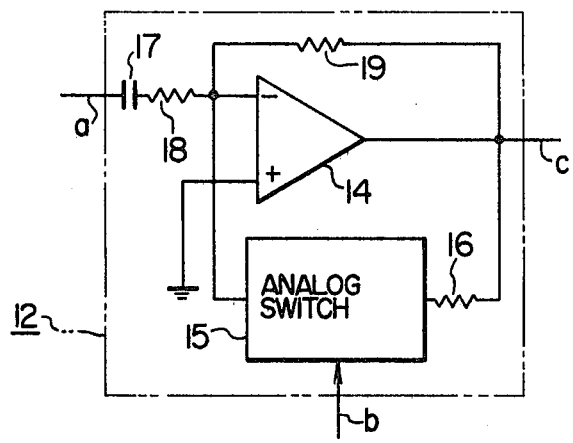
FIG. 3 is a circuit diagram of a form of a variable gain amplifier used in FIG. 2.

Turning now to FIG. 2, there is shown a block diagram of an ultrasonic wave distance detection system in accordance with an embodiment of the present invention, which includes the oscillator 1 for generating carrier waves of a carrier frequency available for ultrasonic waves to be emitted, the first pulse generator 2 for generating a transmit/receive switching signal, the transmit/receive switching circuit 3 which responds to the transmit/receive switching signal, the ultrasonic wave transducer 4 for transmission and reception of ultrasonic wave pulses, a second pulse generator 13 for generating a gain control signal of a given pulse width in synchronization with the switching signal, a variable gain amplifier 12 which changes its gain according to the gain control signal, the band pass filter 6 connected with an output of the variable gain amplifier 12, the envelope detector 7 connected with an output of the band pass filter 6, the comparator 8 for comparison of an output signal of the envelope detector 7 with a selected reference voltage, and the flip-flop circuit 11 which receives the switching signal and an output signal from the comparator 8.

FIG. 3 shows a circuit diagram of a form of the variable gain amplifier 12 used in FIG. 2, which comprises an operational amplifier 14, an analog switch 15 capable of opening or closing according to the gain control signal, a resistor 16 coupled between one terminal of the analog switch 15 and an output of the operational amplifier 14, a capacitor 17, a resistor 18 connected between one terminal of the capacitor 17 and an inverted input of the amplifier 14, and a resistor 19 connected between the inverted input of the amplifier 14 and the output thereof.

With the above arrangement, the ultrasonic wave distance detection system of the present invention will operate as follows.

Figure 4:
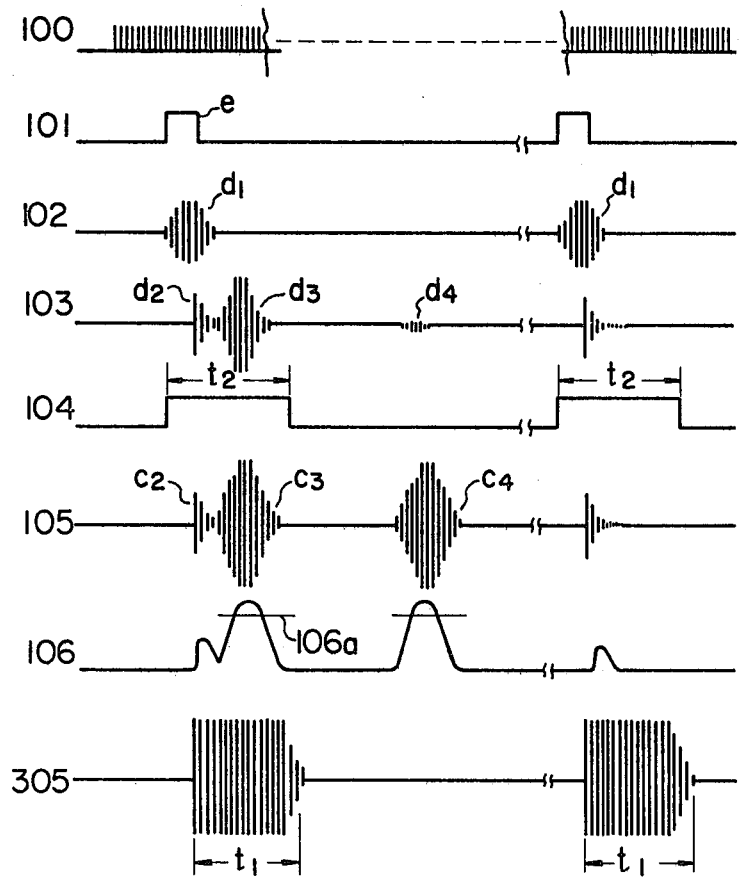
FIG. 4 shows waveforms of signals which appear at various points in FIG. 2 and FIG. 3.

FIG. 4 shows waveforms of signals at various points in FIG. 2 and FIG. 3. In the same figure, when a transmit/receive switching signal 101 is at a level of "1", a drive signal 100 from the oscillator 1 is supplied to the ultrasonic wave transducer 4, thereby emitting therefrom an ultrasonic wave pulse into the selected area. When the switching signal 101 changes to level "0", vibration in the transducer 4 remains in the form of damping vibration or oscillation, even after removal of the excitation signal 100 from the transducer 4. Therefore, an output voltage 102 with waveforms d1 appears across the transducer 4.

As a result, a signal 103 applied to the amplifier will include unwanted signals d2 due to damping oscillation generated at the transducer 4. In the prior art system, the unwanted signals will cause an output signal 305 of the amplifier to be saturated. However, in this embodiment of the present invention, the analog switch 15 for the variable gain amplifier 12 will be closed during the time t2 (which is selected to be equal to or greater than t1) in which the gain control signal 104 from the second pulse generator has a level "1", so that the feedback resistor for the operational amplifier 14 forms a parallel circuit with the resistors 16 and 19, whereby the gain of the variable gain amplifier 12 can be reduced and thus the unwanted signals d2 (resulting from said damping oscillation at the transducer 4) amplified through the amplifier can be minimized. On the other hand, the ultrasonic wave pulse emitted or transmitted into the selected area is reflected on an object and part of the reflected wave pulse is received by the transducer. Signals d3 and d4 received at the transducer are supplied to the gain amplifier 12 for amplification. The amplified signals are sent to the band pass filter 6 to remove noise components therefrom and further to the envelope detector 7 for detection. The output of the detector 7 is compared at the comparator 8 with a selected reference level 106a and the output (the compared result) of the comparator 8 is applied to the reset terminal of the flip-flop circuit 11.

Accordingly, the flip-flop circuit 11 has a logic level "1" at its data terminal and receives at its clock terminal said transmit/receive switching signal 101, to thus generate a pulse signal of a time duration from emission of the ultrasonic wave pulse to reception of an echo signal d3 reflected from the shortest object, i.e., a pulse signal of a time duration corresponding to the distance between the system and the object. This echo signal d3 is so high in level that an output signal c3 of the variable gain amplifier 12 is sufficiently higher than the selected reference level 106a even if the amplifier is low in the gain level. This will allow detection of an object at a shorter distance from the system. Also, with regard to the echo signal d4 sent from an object at a longer distance, the system can also detect the object since the amplifier 12 already reaches a higher gain level.

Figure 5:
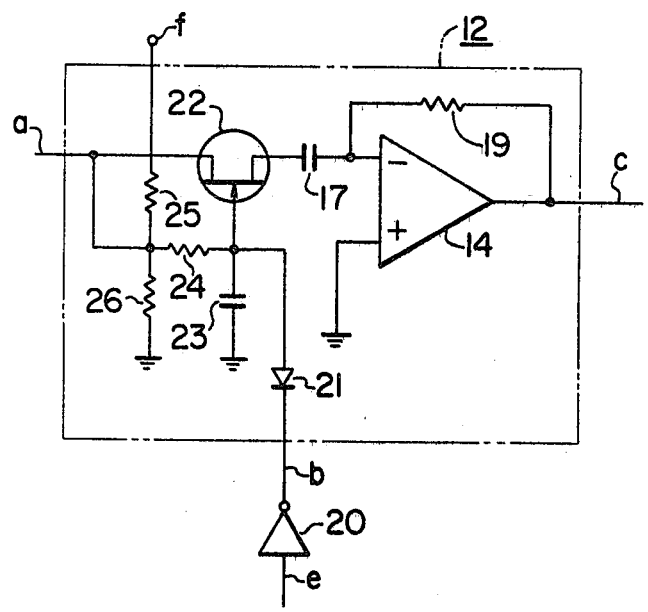
FIG. 5 is a circuit diagram of another form of the variable gain amplifier in FIG. 2.

FIG. 5 shows a circuit diagram of another form of the variable gain amplifier 12 used in FIG. 2.

The gain amplifier of FIG. 5 includes an inverter 20 in place of the second pulse generator 13 in FIG. 2. The inverter 20 receives a transmit/receive switching signal "e" to generate a pulse signal "b" (which has an inverted phase to the input signal). The variable gain amplifier 12 comprises the operational amplifier 14, the feedback resistor 19, the capacitor 17, a diode 21 coupled between an output of the inverter 20 and a cathode of the diode, a field effect transistor (which is hereinafter referred to simply as the FET) 22 which has a gate terminal connected to an anode of the diode 21, a drain terminal connected to one end of the capacitor 17 and an input connected to the drain terminal, a capacitor 23 one end of which is connected to the gate of the FET 22 and the other end of which is connected to ground, resistors 25 and 26 used to divide the voltage between a power terminal "f" and ground for supply of a desired potential to the FET; and a resistor 24 connected respectively to the resistors 25, 26 and to the gate terminal of the FET 22.

Figure 6:
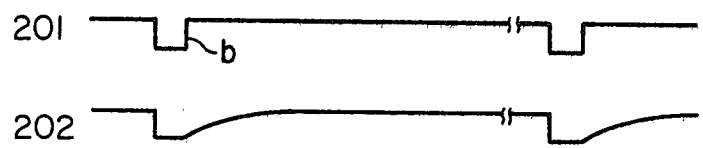
FIG. 6 shows waveforms of signals which appear at points in FIG. 5.

FIG. 6 shows waveforms of signal at points in FIG. 5.

In FIG. 6, when an output signal 201 of the inverter 20 is "0" which is inverse in phase with respect to the transmit/receive switching signal, that is, at the time of transmission of an ultrasonic wave pulse, the diode 21 is conductive so that the gate potential of the FET 22 is zero. The impedance between the source and drain of the FET 22 will become high, which results in a reduced gain of the variable gain amplifier 12. On the other hand, if the output signal 201 from the inverter 20 changes to the "1" level (wave receiving mode), then the capacitor 23 will be charged through the resistors 24 and 25 so that a potential 202 at the gate of the FET 22 increases with an exponential function of a given time constant. As a result, the impedance between the source and drain of the FET 22 will be kept high while damping oscillation remains in the transducer 4 at the beginning of reception of an ultrasonic wave, and subsequently will be decreased gradually.

This results in the fact that the gain of the variable gain amplifier 12 will be low at the beginning of wave reception and subsequently will increase gradually, whereby the similar effect to in the earlier first embodiment can be obtained.

With the arrangement as has been disclosed, the present invention has an excellent advantage that by reducing the gain of the variable gain amplifier only at the beginning of reception, the detection power or ability of the ultrasonic wave distance detection system according to the present invention can be maintained and at the same time, not only a long distance object, but also a short distance object can be detected or measured.

While the present invention has been explained with reference to the preferred embodiments shown in the drawings, it should be understood that the invention is not limited to those embodiments but covers all other possible modifications, alternatives and equivalent arrangements included in the scope of the appended claims.

We claim:

1. An ultrasonic wave distance detection system comprising:
   ultrasonic wave transducer means for sending and receiving ultrasonic wave pulses;
   oscillator means for generating carrier waves of a carrier frequency available for said ultrasonic wave pulses;
   first pulse generator means for generating transmit/receive switching signals;
   second pulse generator means for generating gain control signals of a selected pulse width in synchronization with said transmit/receive switching signal;
   variable gain amplifier means comprising an operational amplifier having an inverted input terminal and an output terminal, an analog switch coupled to said inverted input terminal and responsive to said gain control signal, a series circuit including a capacitor and an input resistor connected with said inverted input terminal, and a feedback resistor connected between said inverted input terminal and said output terminal of the operational amplifier, said variable gain amplifier means for controlling the gain of signals applied to said amplifier means in accordance with said gain control signal; and
   transmit/receive switching circuit means for effecting selective changeover between said transducer means, oscillator means, first pulse generator means and amplifier means in response to the switching signal; and
   detecting circuit means for detecting the presence of an obstacle according to the output of said amplifier means;
   wherein the gain of said variable gain amplifier means is decreased at the beginning of reception of the ultrasonic wave pulses.

2. An ultrasonic wave distance detection system comprising:
   ultrasonic wave transducer means for sending and receiving ultrasonic wave pulses;
   oscillator means for generating carrier waves of a carrier frequency available for said ultrasonic wave pulses;
   first pulse generator means for generating transmit/receive switching signals;
   second pulse generator means for generating gain control signals of a selected pulse width in synchronization with said transmit/receive switching signal;
   variable gain amplifier means comprising an operational amplifier having an inverted input terminal and an output terminal, a capacitor connected with said inverted input terminal, a field effect transistor connected between one end of said capacitor and an input terminal and responsive to said gain control signal, and resistors for applying a selected potential to a gate terminal of said field effect transistor, said variable gain amplifier means for controlling the gain of signals applied to said input terminal in accordance with said gain control signal;
   transmit/receive switching circuit means for effecting selective changeover between said transducer means, oscillator means, first pulse generator means and amplifier means in response to the switching signal; and
   detection circuit means for detecting the presence of an obstacle according to the output of said amplifier means;
   wherein the gain of said variable gain amplifier means is decreased at the beginning of reception of the ultrasonic wave pulses.

3. An ultrasonic wave distance detection system comprising:
   ultrasonic wave transducer means for sending and receiving ultrasonic wave pulses;
   oscillator means for generating carrier waves of a carrier frequency available for said ultrasonic wave pulses;
   first pulse generator means for generating transmit/receive switching signals;
   second pulse generator means for generating gain control signals of a selected pulse width in synchronization with said transmit/receive switching signal;
   variable gain amplifier means comprising an operational amplifier having an inverted input terminal and an output terminal, input resistance means coupled to said inverted input terminal, feedback resistance means connected between said inverted input terminal and said output terminal, and means, responsive to said gain control signals, for varying an impedance of at least one of said input resistance means and said feedback resistance means in accordance with said gain control signal, said variable gain amplifier means for varying the gain of signals applied to said amplifier means in accordance with said gain control signals;
   transmit/receive switching circuit means for effecting selective changeover between said transducer means, oscillator means, first pulse generator means and amplifier means in response to the switching signal; and
   detection circuit means for detecting the presence of an obstacle according to the output of said amplifier means;

wherein the gain of said variable gain amplifier means is decreased at the beginning of reception of the ultrasonic wave pulses.

4. An ultrasonic wave distance detection system as set forth in claim 1, 2 or 3 wherein said detection circuit means comprises:
an envelope detection circuit means for envelope-detecting the output of said amplifier means;
a comparator for comparing an output signal of said envelope detection circuit with a predetermined level; and
a flip-flop circuit which receives the switching signal and an output signal from said comparator to generate a pulse signal of a time duration corresponding to the distance between said system and said obstacle.

* * * * *